United States Patent
Ohashi

(10) Patent No.: US 10,702,851 B2
(45) Date of Patent: Jul. 7, 2020

(54) METAL-ORGANIC FRAMEWORK AND METHOD OF MANUFACTURING THE SAME

(71) Applicant: TOYOTA JIDOSHA KABUSHIKI KAISHA, Toyota-shi, Aichi-ken (JP)

(72) Inventor: Yoshio Ohashi, Susono (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 0 days.

(21) Appl. No.: 15/939,662

(22) Filed: Mar. 29, 2018

(65) Prior Publication Data
US 2018/0280929 A1 Oct. 4, 2018

(30) Foreign Application Priority Data
Mar. 31, 2017 (JP) .................................. 2017-070809

(51) Int. Cl.
*B01J 20/22* (2006.01)
*C07F 7/00* (2006.01)

(52) U.S. Cl.
CPC ............. *B01J 20/226* (2013.01); *C07F 7/003* (2013.01)

(58) Field of Classification Search
None
See application file for complete search history.

(56) References Cited

U.S. PATENT DOCUMENTS

| 2015/0073164 A1 | 3/2015 | Nomura et al. |
| 2016/0361702 A1 | 12/2016 | Cohen et al. |
| 2017/0008915 A1* | 1/2017 | Yaghi ................. B01D 33/00 |

FOREIGN PATENT DOCUMENTS

| CN | 105921117 A | 9/2016 |
| CN | 106544010 A | 3/2017 |
| JP | 2015-077594 A | 4/2015 |
| WO | 2015/127033 A1 | 8/2015 |

OTHER PUBLICATIONS

Furukawa et al., "The Chemistry and Applications of Metal-Organic Frameworks", Science, vol. 341, pp. 974-986, Aug. 30, 2013.
Chui et al., "A Chemically Functionalizable Nanoporous Material $[Cu_3(TMA)_2(H_2O)_3]n$", Science, vol. 283, pp. 1148-1150, Feb. 19, 1999.
"Descriptive Inorganic Chemistry", Tokyo Kagaku Doujin, pp. 98-99, Mar. 19, 2009 (5 pages total).
"Fundamentals of Porous Coordination Polymer(PCP)/Metal-Organic Framework(MOF)", Aldrich Materials Science Fundamentals of Materials Science, No. 7, p. 3, (3 pages total) https://www.sigmaaldrich.com/content/dam/sigmaaldrich/docs/SAJ/Brochure/1/saj1480_mmb7.pdf.
Hiroyasu Furukawa et al.: "Water Adsorption in Porous Metal-Organic Frameworks and Related Materials", Journal of the American Chemical Society. 2014, 136, p. 4369-p. 4381, Mar. 3, 2014.

(Continued)

*Primary Examiner* — Clinton A Brooks
(74) *Attorney, Agent, or Firm* — Sughrue Mion, PLLC

(57) ABSTRACT

A metal-organic framework includes: a tetravalent Group 4 element ion or a tetravalent rare earth ion as a metal ion; and an ion of a first organic molecule having a trimesic acid skeleton and an ion of a second organic molecule having an isophthalic acid skeleton as multidentate ligands.

18 Claims, 10 Drawing Sheets

(56) References Cited

OTHER PUBLICATIONS

Weibin Liang et al.: "Tuning pore size in a zirconium-tricarboxylate metal-organic framework", the Royal Society of Chemistry, CrystEngComm. 2014, 16, p. 6530-p. 6533, Jun. 4, 2014.
Zhenlan Fang et al.: "Structural Complexity in Metal—Organic Frameworks: Simultaneous Modification of Open Metal Sites and Hierarchical Porosity by Systematic Doping with Defective Linkers", Journal of the American Chemical Society. 2014, 136, p. 9627-p. 9636, Jun. 10, 2014.
Cesare Atzori et al.: "Effect of Benzoic Acid as a Modulator in the Structure of UiO-66: An Experimental and Computational Study", The Journal of Physical Chemistry C 2017, 121, p. 9312-p. 9324, Apr. 5, 2017.
Greig C Shearer et al.: "Defect Engineering: Tuning the Porosity and Composition of the Metal—Organic Framework UiO-66 via Modulated Synthesis", Chemistry of Materials. 2016, 28, p. 3749-p. 3761, May 9, 2016.
Communication dated Jun. 6, 2018, from the European Patent Office in counterpart European Application No. 18164725.6.
Database WPI, "Metal Organic Frame Material Treat Dye Comprise Trimesic Acid Phthalic Copper Nitrate," Week 201671, AN 2016-59985K -& CN 105 921 117 A (Univ Hubei), Sep. 7, 2016, XP-002781314, Thomson Scientific, London, GB, one page total.

\* cited by examiner

METAL-ORGANIC FRAMEWORK AND METHOD OF MANUFACTURING THE SAME

INCORPORATION BY REFERENCE

The disclosure of Japanese Patent Application No. 2017-070809 filed on Mar. 31, 2017 including the specification, drawings and abstract is incorporated herein by reference in its entirety.

BACKGROUND

1. Technical Field

The present disclosure discloses a metal-organic framework and a method of manufacturing the same.

2. Description of Related Art

A metal-organic framework (hereinafter, also referred to as "MOF") that is a porous compound has been researched and developed as a material having a function such as gas storage or gas separation.

As a technique relating to MOF, for example, H. Furukawa et al. "Water adsorption in porous metal-organic frameworks and related materials" J. Am. Chem. Soc. 2014, 136, 4369-4381. discloses an MOF (MOF-808) including $Zr^{4+}$ as a metal ion, a trimesate ion as a multidentate ligand, and a formate ion as a monodentate ligand. W. Liang et al. "Turning pore size in a zirconium-tricarboxylate metal-organic framework" CrystEngComm. 2014, 16, 6530-6533. discloses an MOF including $Zr^{4+}$ as a metal ion, a trimesate ion as a multidentate ligand, and a formate ion, an acetate ion, or a propanoate ion as a monodentate ligand.

SUMMARY

The MOFs disclosed in H. Furukawa et al. "Water adsorption in porous metal-organic frameworks and related materials" J. Am. Chem. Soc. 2014, 136, 4369-4381., and W. Liang et al. "Turning pore size in a zirconium-tricarboxylate metal-organic framework" CrystEngComm. 2014, 16, 6530-6533. exhibit characteristics of adsorbing and desorbing water vapor according to a change in relative humidity, but have room for improvement of the adsorption amount and the desorption amount of water vapor. In addition, in the MOFs disclosed in H. Furukawa et al. "Water adsorption in porous metal-organic frameworks and related materials" J. Am. Chem. Soc. 2014, 136, 4369-4381., and W. Liang et al. "Turning pore size in a zirconium-tricarboxylate metal-organic framework" CrystEngComm. 2014, 16, 6530-6533., in a case where water vapor is adsorbed and desorbed under conditions where a change in relative humidity is relatively small, there is a problem in that the desorption does not progress sufficiently and the adsorbed water vapor cannot be fully used. For example, H. Furukawa et al. "Water adsorption in porous metal-organic frameworks and related materials" J. Am. Chem. Soc. 2014, 136, 4369-4381. describes the following. In a case where the relative humidity is increased from 20% to 40% during water vapor adsorption and desorption amount measurement using the MOF-808, the adsorption amount of water vapor is about 600 mL (STP)/g. On the other hand, even in a case where the relative humidity is decreased from 40% to 20%, the desorption amount of water vapor is merely about 400 mL (STP)/g.

The present disclosure provides a metal-organic framework in which the adsorption amount and the desorption amount of water vapor are further improved, and a method of manufacturing the same.

A first aspect of the present disclosure relates to a metal-organic framework including: a tetravalent Group 4 element ion or a tetravalent rare earth ion as a metal ion; and an ion of a first organic molecule having a trimesic acid skeleton or an ion of a second organic molecule having an isophthalic acid skeleton as multidentate ligands.

In the metal-organic framework according to the first aspect of the present disclosure, the metal ion may be at least one selected from the group consisting of $Zr^{4+}$, $Hf^{4+}$, and $Ce^{4+}$.

In the metal-organic framework according to the first aspect of the present disclosure, the metal ion may be $Zr^{4+}$.

In the metal-organic framework according to the first aspect of the present disclosure, the ion of the first organic molecule having the trimesic acid skeleton may be a trimesate ion.

In the metal-organic framework according to the first aspect of the present disclosure, an overall electric charge of the ion of the second organic molecule having an isophthalic acid skeleton may be −2 or more.

In the metal-organic framework according to the first aspect of the present disclosure, the ion of the second organic molecule having the isophthalic acid skeleton may be at least one selected from the group consisting of an isophthalate ion, a 5-hydroxyisophthalate ion, a 5-nitroisophthalate ion, a 5-tert-butylisophthalate ion, a 5-chloroisophthalate ion, a 4-bromoisophthalate ion, and a 4,6-dimethylisophthalate ion.

In the metal-organic framework according to the first aspect of the present disclosure, the ion of the second organic molecule having the isophthalic acid skeleton may be an isophthalate ion.

In the metal-organic framework according to the first aspect of the present disclosure, a proportion of the ion of the second organic molecule having the isophthalic acid skeleton may be lower than 8.4 mol % with respect to all the multidentate ligands.

The metal-organic framework according to the first aspect of the present disclosure may further include a monovalent linear saturated aliphatic carboxylate ion having 1 to 3 carbon atoms as a monodentate ligand.

In the metal-organic framework according to the first aspect of the present disclosure, the monodentate ligand may be at least either a formate ion or an acetate ion.

A second aspect of the present disclosure relates to a method of manufacturing a metal-organic framework including heating a solution including a metal ion source that includes a tetravalent Group 4 element ion or a tetravalent rare earth ion, a first organic molecule having a trimesic acid skeleton or a salt thereof, a second organic molecule having an isophthalic acid skeleton or a salt thereof, and a solvent.

In the method of manufacturing a metal-organic framework according to the second aspect of the present disclosure, the metal ion source may be a zirconium compound.

In the method of manufacturing a metal-organic framework according to the second aspect of the present disclosure, the zirconium compound may be at least either zirconium oxychloride octahydrate or zirconium chloride.

In the method of manufacturing a metal-organic framework according to the second aspect of the present disclosure, the first organic molecule having the trimesic acid skeleton may be trimesic acid.

In the method of manufacturing a metal-organic framework according to the second aspect of the present disclosure, the second organic molecule having the isophthalic acid skeleton may not have a functional group having a lower pKa than a carboxyl group of isophthalic acid.

In the method of manufacturing a metal-organic framework according to the second aspect of the present disclosure, the second organic molecule having the isophthalic acid skeleton may be at least one selected from the group consisting of isophthalic acid, 5-hydroxyisophthalic acid, 5-nitroisophthalic acid, 5-tert-butylisophthalic acid, 5-chloroisophthalic acid, 4-bromoisophthalic acid, and 4,6-dimethylisophthalic acid.

In the method of manufacturing a metal-organic framework according to the second aspect of the present disclosure, the second organic molecule having the isophthalic acid skeleton may be isophthalic acid.

In the method of manufacturing a metal-organic framework according to the second aspect of the present disclosure, a proportion of the second organic molecule having the isophthalic acid skeleton may be lower than 40 mol % with respect to a total amount of the first organic molecule having the trimesic acid skeleton and the second organic molecule having the isophthalic acid skeleton.

In the method of manufacturing a metal-organic framework according to the second aspect of the present disclosure, an amide and a carboxylic acid may be used as the solvent.

In the method of manufacturing a metal-organic framework according to the second aspect of the present disclosure, the amide may be at least either N,N-dimethylformamide or N,N-diethylformamide.

In the method of manufacturing a metal-organic framework according to the second aspect of the present disclosure, the carboxylic acid may be a monovalent linear saturated aliphatic carboxylic acid having 1 to 3 carbon atoms.

In the method of manufacturing a metal-organic framework according to the second aspect of the present disclosure, the carboxylic acid may be at least either formic acid or acetic acid.

The present disclosure can provide a metal-organic framework in which the adsorption amount and the desorption amount of water vapor are further improved, and a method of manufacturing the same.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, the present disclosure will be described with reference to the drawings. The following embodiment is an example of the present disclosure and does not limit the present disclosure.

1. Metal-Organic Framework (MOF)

A first embodiment of the present disclosure relates to a metal-organic framework (MOF) including: a tetravalent Group 4 element ion or a tetravalent rare earth ion as a metal ion; and an ion of an organic molecule having a trimesic acid skeleton or an ion of an organic molecule having an isophthalic acid skeleton as multidentate ligands.

Figure 1:
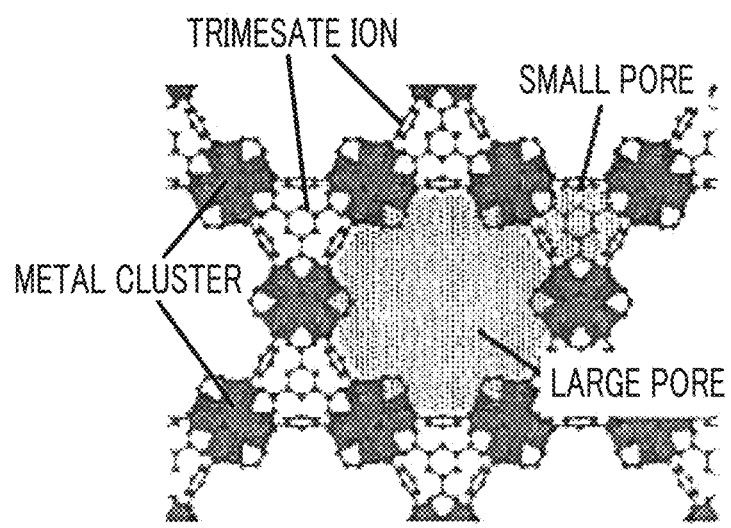
FIG. 1 is a diagram showing a crystal structure showing an MOF (MOF-808) according to the related art.
Figure 2:
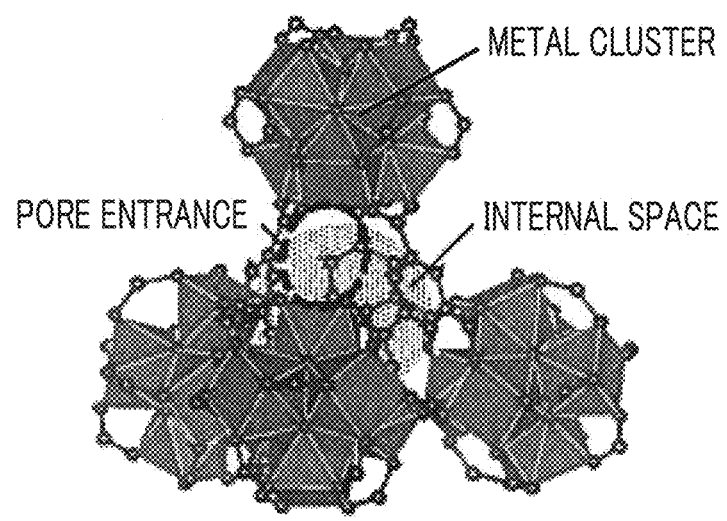
FIG. 2 is a diagram showing a cage that forms a small pore in the crystal structure of the MOF according to the related art.
Figure 3:
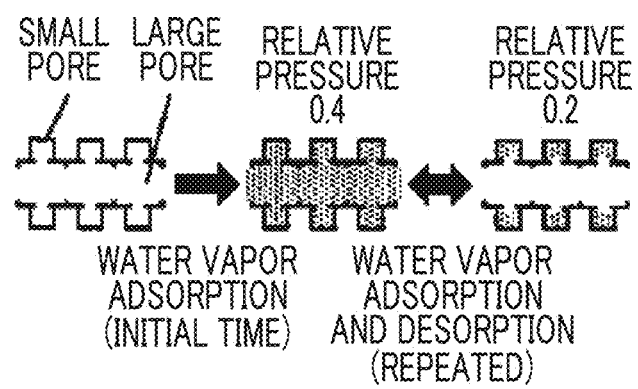
FIG. 3 is a diagram schematically showing a positional relationship between large pores and small pores in the MOF according to the related art and schematically showing a state of the inside of the pores during adsorption and desorption of water vapor.
Figure 4:
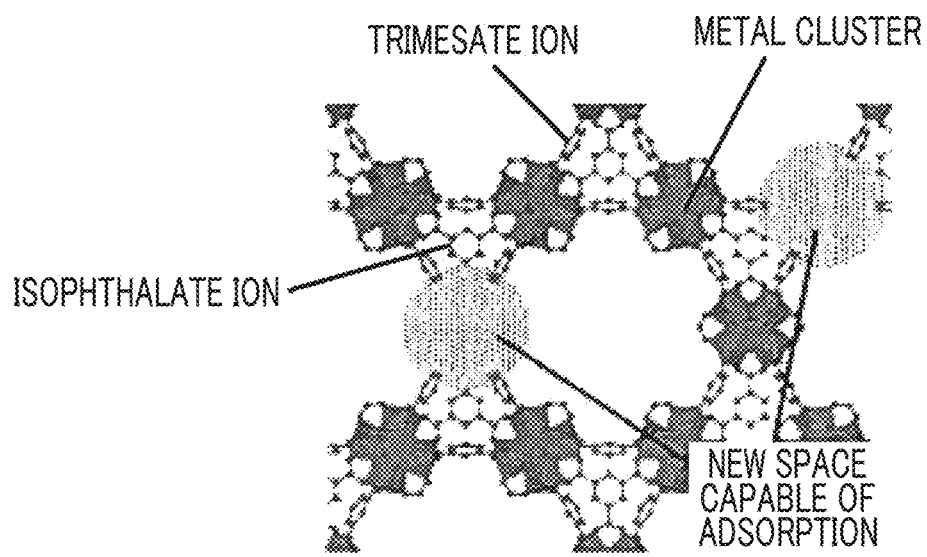
FIG. 4 is a diagram corresponding to FIG. 1 showing an exemplary crystal structure of an MOF according to the present disclosure.
Figure 5:
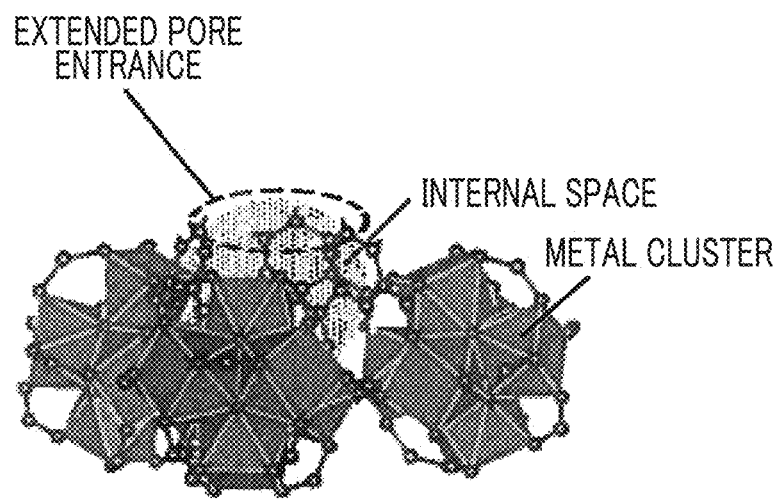
FIG. 5 is a diagram corresponding to FIG. 2 showing a cage into which a defect is introduced in the exemplary crystal structure of the MOF according to the present disclosure.
Figure 6:
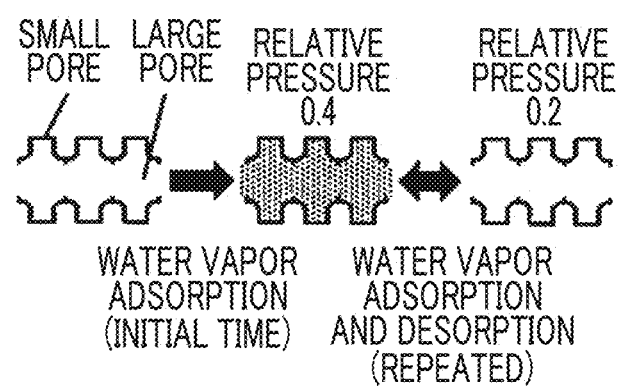
FIG. 6 is a diagram corresponding to FIG. 3 schematically showing a positional relationship between large pores and small pores in the MOF according to the present disclosure and schematically showing a state of the inside of the pores during adsorption and desorption of water vapor.

With the MOF according to the present disclosure, the adsorption amount and the desorption amount of water vapor can be improved compared to an MOF according to the related art. The MOF according to the present disclosure can sufficiently perform desorption under conditions where a change in relative humidity is relatively small. The presumed reason for this will be described with reference to FIGS. 1 to 6. FIGS. 1 to 3 are diagrams showing a crystal structure of an MOF-808 according to the related art, and FIGS. 4 to 6 are diagrams showing an exemplary crystal structure of the MOF according to the present disclosure. FIGS. 1 to 3 correspond to FIGS. 4 to 6, respectively.

FIG. 1 is a diagram showing the crystal structure showing the MOF (MOF-808) according to the related art. As shown in FIG. 1, the MOF according to the related art has a three-dimensional structure in which metal clusters (in the example shown in FIGS. 1 and 2, $Zr_6O_4(OH)_4(-CO_2)_6$) including $Zr^{4+}$ that are secondary building units (SBU) are linked to each other through an ion of an organic molecule having a trimesic acid skeleton (a tridentate ligand; in the example shown in FIGS. 1 and 2, a trimesate ion) that is an organic linker, and includes two kinds of pores (large pores and small pores) having different sizes. FIG. 2 is a diagram showing a cage that forms a small pore in a crystal structure of the MOF according to the related art. As shown in FIG. 2, a small pore is formed in a tetrahedral cage that is formed by linking four metal clusters to each other through a trimesate ion to be positioned on apexes of the tetrahedron. As shown in FIG. 2, a structure (so-called an ink bottle structure) in which an entrance of the small pore is narrower than an internal space is adopted. FIG. 3 is a diagram schematically showing a positional relationship between large pores and small pores and schematically showing a state of the inside of the pores during adsorption and desorption of water vapor. As shown in FIG. 3, large pores and small pores have a positional relationship in which a small pore is present on a back side of a position where large pores are linked, and a small pore has an ink bottle structure as described above. Since the MOF according to the related art has the structure, the following is presumed. Water vapor can be adsorbed by both large pores and small pores during adsorption, but it is difficult to desorb water vapor adsorbed in the small pores during desorption. In particular, adsorption and desorption are repeated under conditions where a change in relative humidity is relatively small (for example, relative pressure: 0.2 to 0.4), desorption of water vapor adsorbed in the small pores does not sufficiently occur, and the water vapor adsorbed in the small pores cannot be fully used.

On the other hand, in the MOF according to the present disclosure, the following is presumed. Some ions of the organic molecule having a trimesic acid skeleton (tridentate ligands; in the example shown in FIGS. 4 and 5, trimesate ions) are exchanged with ions of the organic molecule having an isophthalic acid skeleton (bidentate ligands; in the example shown in FIGS. 4 and 5, isophthalate ions). As a result, functional groups coordinated to the metal ions and negative electric charges are insufficient, and as shown in FIGS. 4 and 6, defects are introduced into the structure of the MOF for charge compensation. Thus, it is presumed that a new space capable of adsorption increases and the weight decreases due to a decrease in skeleton density such that the adsorption amount and the desorption amount of water vapor increases. In addition, as shown in FIGS. 4 and 6, it is presumed that entrances of small pores increase in size due to the introduction of the defects, and the ink bottle structure is deformed. As a result, it is presumed that water vapor adsorbed in the small pores is likely to be desorbed under conditions where a change in relative humidity is relatively small. Hereinafter, each of the components constituting the MOF according to the present disclosure will be described in order.

1.1. Metal Ion

The MOF according to the present disclosure includes a tetravalent Group 4 element ion or a tetravalent rare earth ion as a metal ion. In order to obtain the crystal structure of the MOF according to the present disclosure, the metal ion needs to be tetravalent. Examples of the tetravalent Group 4 element ion include $Ti^{4+}$, $Zr^{4+}$, and $Hf^{4+}$. Examples of the tetravalent rare earth ion include $Ce^{4+}$, $Pr^{4+}$, $Tb^{4+}$, and $Dy^{4+}$. The MOF according to the present disclosure includes plural kinds of metal ions selected from the examples of the tetravalent Group 4 element ion and the examples of the tetravalent rare earth ion. The metal ion is not particularly limited but needs to be eight-coordinated to an oxide ion ($O^{2-}$) to form a metal cluster that is a secondary building unit (SBU) of the MOF. Therefore, a metal ion having a relatively large ionic radius is suitable. In consideration of availability and stability of a tetravalent ion, at least one kind of ion selected from the group consisting of $Zr^{4+}$, $Hf^{4+}$, and $Ce^{4+}$ is preferable, and $Zr^{4+}$ is more preferable.

1.2. Multidentate Ligand

The MOF according to the present disclosure includes an ion of an organic molecule having a trimesic acid skeleton and an ion of an organic molecule having an isophthalic acid skeleton as multidentate ligands.

1.2.1. Ion of Organic Molecule Having Trimesic Acid Skeleton

The ion of the organic molecule having a trimesic acid skeleton refers to, for example, an ion having a structure represented by the following Formula (1).

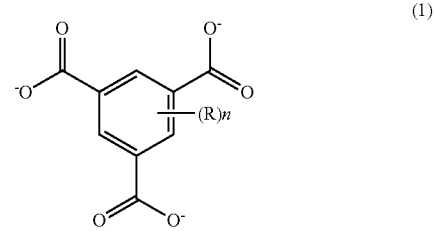

(1)

In Formula (1), R represents a substituent, and n represents a natural number of 1 to 3. The substituent R is not particularly limited as long as it can form the MOF according to the present disclosure, and examples thereof include a hydroxy group, a nitro group, a fluoro group, a chloro group, a bromo group, an iodine group, a methyl group, an ethyl group, and a tert-butyl group.

Specific examples of the ion of the organic molecule having a trimesic acid skeleton that has the structure and can form the MOF according to the present disclosure include at least one selected from the group consisting of a trimesate ion ($BTC^{3-}$), a 2-hydroxy-1,3,5-benzenetricarboxylate ion, a 2-nitro-1,3,5-benzenetricarboxylate ion, a 2-chloro-1,3,5-benzenetricarboxylate ion, a 2-bromo-1,3,5-benzenetricarboxylate ion, and a 2-methyl-1,3,5-benzenetricarboxylate ion. In particular, the ion of the organic molecule having a trimesic acid skeleton is not particularly limited and is preferably a trimesate ion ($BTC^{3-}$).

1.2.2. Ion of Organic Molecule having Isophthalic Acid Skeleton

The ion of the organic molecule having an isophthalic acid skeleton refers to, for example, an ion having a structure represented by the following Formula (2).

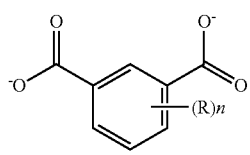

(2)

In Formula (2), R represents a substituent, and n represents a natural number of 1 to 4. The substituent R is not particularly limited as long as it can allow the ion of the organic molecule to function as an organic linker and can form the MOF according to the present disclosure, and examples thereof include a hydroxy group, a nitro group, a fluoro group, a chloro group, a bromo group, an iodine group, a methyl group, an ethyl group, and a tert-butyl group.

An overall electrical charge of the ion of the organic molecule having an isophthalic acid skeleton needs to be −2 or more. It is presumed that, in a case where the overall electric charge of the ion of the organic molecule having an isophthalic acid skeleton is −3 or less, the overall electric charge of the ion of the organic molecule having a trimesic acid skeleton to be exchanged is −3, and thus charge compensation is not needed and the introduction of defects (defects of positively charged metal ions) does not occur. In a case where the overall electric charge of the ion is −1, the ion of the organic molecule having an isophthalic acid skeleton is, for example, a positively charged substituent such as a trimethylammonium group $[N(CH_3)_3^+]$ or a triethylammonium group $[N(C_2H_5)_3^+]$.

Specific examples of the ion of the organic molecule having an isophthalic acid skeleton that has the structure and can form the MOF according to the present disclosure include at least one selected from the group consisting of an isophthalate ion ($m$-$BDC^{2-}$), a 5-hydroxyisophthalate ion ($5$-OH-$m$-$BDC^{2-}$), a 5-nitroisophthalate ion ($5$-$NO_2$-$m$-$BDC^{2-}$), a 5-tert-butylisophthalate ion ($5$-tert-Bu-$m$-$BDC^{2-}$), a 5-chloroisophthalate ion ($5$-Cl-$m$-$BDC^{2-}$), a 4-bromoisophthalate ion ($4$-Br-$m$-$BDC^{2-}$), and a 4,6-dimethylisophthalate ion ($4,6$-$2CH_3$-$m$-$BDC^{2-}$). In particular, the ion of the organic molecule having a trimesic acid skeleton is not particularly limited and is preferably an isophthalate ion ($m$-$BDC^{2-}$).

In the MOF according to the present disclosure, it is preferable that a proportion of the ion of the organic molecule having an isophthalic acid skeleton is lower than 8.4 mol % with respect to all the multidentate ligands. In a case where the proportion of the ion of the organic molecule having an isophthalic acid skeleton is 8.4 mol % or higher with respect to all the multidentate ligands, the amount of defects increases, and the crystal structure of the MOF is not likely to be maintained.

1.3. Monodentate Ligand

The MOF according to the present disclosure may include a monodentate ligand. For example, in a preferred embodiment of a method of manufacturing a metal-organic framework according to a second embodiment of the present disclosure described below, a monodentate ligand is used for restricting the number of multidentate ligands coordinated to the metal cluster and easily forming the crystal structure of the MOF according to the present disclosure, and is coordinated to the metal cluster to form a part of the MOF according to the present disclosure. Examples of the monodentate ligand include a monovalent linear saturated aliphatic carboxylate ion having 1 to 3 carbon atoms. The monodentate ligand is preferably at least one selected from the group consisting of a formate ion, an acetate ion, and a propanoate ion and more preferably at least one of a formate ion or an acetate ion. The metal-organic framework according to the present disclosure can be manufactured, for example, using the method of manufacturing a metal-organic framework according to the second embodiment of the present disclosure.

2. Method of Manufacturing Metal-Organic Framework (MOF)

The second embodiment of the present disclosure relates to a method of manufacturing a metal-organic framework (MOF) including a step of heating a solution including a metal ion source that includes a tetravalent Group 4 element ion or a tetravalent rare earth ion, an organic molecule having a trimesic acid skeleton or a salt thereof, an organic molecule having an isophthalic acid skeleton or a salt thereof, and a solvent.

Figure 7:
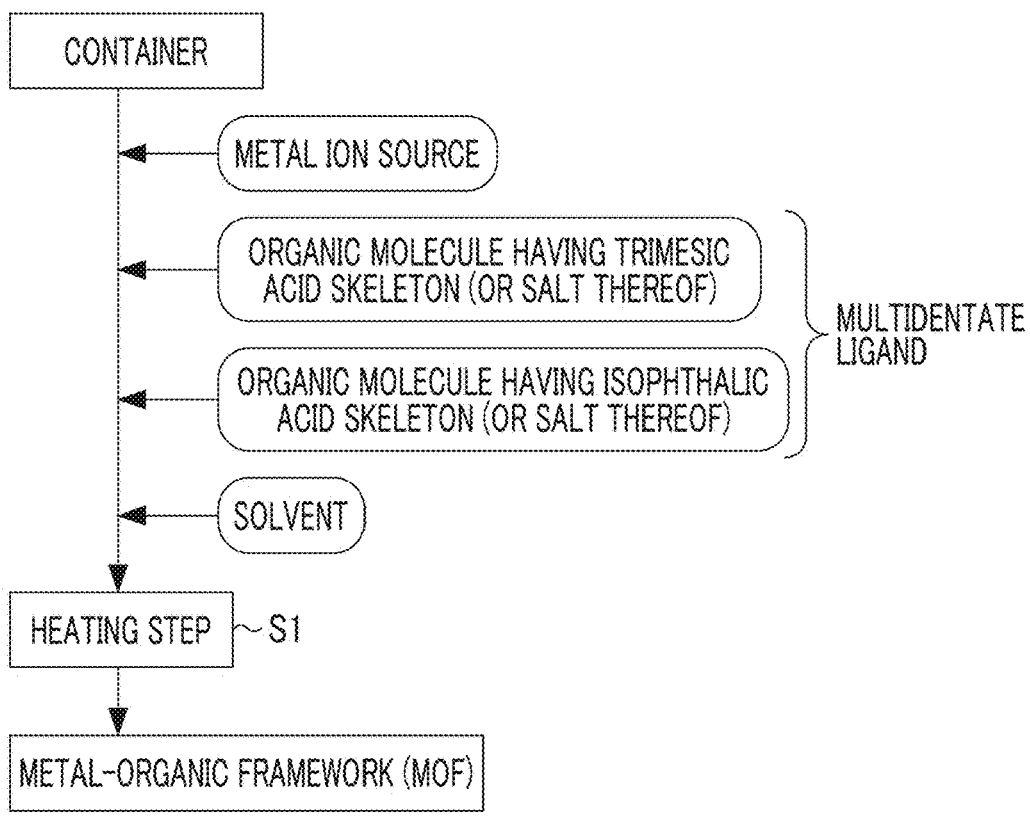
FIG. 7 is a flowchart showing an example of a method of manufacturing an MOF according to the present disclosure.

FIG. 7 is a diagram schematically showing an example of the manufacturing method according to the present disclosure. In the manufacturing method shown in FIG. 7, the MOF is manufactured through a step (heating step (S1)) of adding a metal ion source, an organic molecule having a trimesic acid skeleton or a salt thereof, an organic molecule having an isophthalic acid skeleton or a salt thereof, and a solvent into a container to obtain a solution and heating the obtained solution.

2.1. Metal Ion Source

The metal ion source used in the manufacturing method according to the present disclosure is not particularly limited as long as it can provide the metal ion forming the MOF according to the present disclosure. For example, in a case where the metal ion is at least one selected from the group consisting of $Zr^{4+}$, $Hf^{4+}$, and $Ce^{4+}$, at least one selected from the group consisting of a well-known zirconium compound, a well-known hafnium compound, and a well-known cerium compound can be used as the metal ion source. In particular, the metal ion source is not particularly limited and is preferably a zirconium compound from the viewpoint of availability and the like. Examples of the zirconium compound include at least one of zirconium oxychloride octahydrate ($ZrOCl_2 \cdot 8H_2O$) or zirconium chloride ($ZrCl_4$).

2.2. Organic Molecule Having Trimesic Acid Skeleton

The organic molecule having a trimesic acid skeleton refers to, for example, an organic molecule having a structure represented by the following Formula (3).

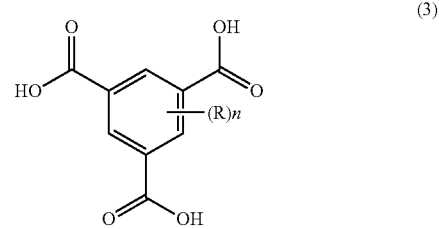

(3)

In Formula (3), R represents a substituent, and n represents a natural number of 1 to 3. The substituent R is not particularly limited as long as it can allow the ion of the organic molecule to function as an organic linker and can form the MOF according to the present disclosure, and examples thereof include a hydroxy group, a nitro group, a fluoro group, a chloro group, a bromo group, an iodine group, a methyl group, and an ethyl group.

Specific examples of the organic molecule having a trimesic acid skeleton that has the structure and can be used in the method of manufacturing an MOF according to the present disclosure include at least one selected from the group consisting of trimesic acid ($H_3BTC$), 2-hydroxy-1,3,5-benzenetricarboxylic acid, 2-nitro-1,3,5-benzenetricarboxylic acid, 2-chloro-1,3,5-benzenetricarboxylic acid, 2-bromo-1,3,5-benzenetricarboxylic acid, and 2-methyl-1,3,5-benzenetricarboxylic acid. In particular, the organic molecule having a trimesic acid skeleton is not particularly limited and is preferably trimesic acid ($H_3BTC$).

Examples of the salt of the organic molecule having a trimesic acid skeleton include a potassium salt, a sodium salt, a lithium salt, an ammonium salt, or an anhydride of the examples of the organic molecule having a trimesic acid skeleton.

2.3. Organic Molecule Having Isophthalic Acid Skeleton

The organic molecule having an isophthalic acid skeleton refers to, for example, an organic molecule having a structure represented by the following Formula (4).

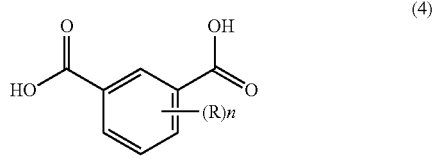

(4)

In Formula (4), R represents a substituent, and n represents a natural number of 1 to 4. The substituent R is not particularly limited as long as it can allow the ion of the organic molecule to function as an organic linker and can form the MOF according to the present disclosure, and examples thereof include a hydroxy group, a nitro group, a fluoro group, a chloro group, a bromo group, an iodine group, a methyl group, an ethyl group, and a tert-butyl group.

It is preferable that the organic molecule having an isophthalic acid skeleton does not have a functional group having a lower pKa (acid dissociation constant) than a carboxyl group of isophthalic acid (m-$H_2BDC$). It is presumed that, in a case where the organic molecule having an isophthalic acid skeleton has a functional group having a lower pKa than a carboxyl group of isophthalic acid (m-$H_2BDC$), the ion has an electric charge of −3 or less, and thus charge compensation is not needed and the introduction of defects does not occur as described above. Examples of the functional group having a lower pKa (acid dissociation constant) than a carboxyl group of isophthalic acid (m-$H_2BDC$) include a sulfo group, a sulfene group, a phosphine group, and a phosphone group.

Specific examples of the organic molecule having an isophthalic acid skeleton that has the structure and can be used in the method of manufacturing an MOF according to the present disclosure include at least one selected from the group consisting of isophthalic acid (m-$H_2BDC$), 5-hydroxyisophthalic acid (5-OH-m-$H_2BDC$), 5-nitroisophthalic acid (5-$NO_2$-m-$H_2BDC$), 5-tert-butylisophthalic acid (5-tert-Bu-m-$H_2BDC$), 5-chloroisophthalic acid (5-Cl-m-$H_2BDC$), 4-bromoisophthalic acid (4-Br-m-$H_2BDC$), and 4,6-dimethylisophthalic acid (4,6-$(CH_3)_2$-m-$H_2BDC$). In particular, the organic molecule having an isophthalic acid skeleton is not particularly limited and is preferably isophthalic acid (m-$H_2BDC$).

Examples of the salt of the organic molecule having an isophthalic acid skeleton include a potassium salt, a sodium salt, a lithium salt, an ammonium salt, or an anhydride of the examples of the organic molecule having an isophthalic acid skeleton.

An ion of an organic molecule having a phthalic acid skeleton (for example, phthalic acid (o-$H_2BDC$)) or an ion of an organic molecule having a terephthalic acid skeleton (for example, terephthalic acid (p-$H_2BDC$)) in which a carboxyl group is present in the ortho position or the para position in Formula (4) is also a bidentate ligand in which two carboxyl groups are bonded to a benzene ring as in the ion of the organic molecule having an isophthalic acid skeleton. However, it is presumed that the ion of the organic molecule having a phthalic acid skeleton in which an angle between two carboxyl groups is 60° or the ion of the organic molecule having a terephthalic acid skeleton in which an angle between two carboxyl groups is 180° cannot be exchanged with the ion of the organic molecule having a trimesic acid skeleton in which an angle between three carboxyl groups is 120° as it is, and thus the crystal structure collapses.

2.4. Solvent

The solvent used in the manufacturing method according to the present disclosure is not particularly limited as long as the metal ion source, the organic molecule having an isophthalic acid skeleton or the salt thereof, and the organic molecule having a trimesic acid skeleton or the salt thereof described above can be dispersed therein and the MOF can be synthesized in the heating step described below. From the viewpoint of promoting the synthesis of the MOF, it is preferable that an amide or a carboxylic acid is used.

2.4.1. Amide

Examples of the amide used in the manufacturing method according to the present disclosure include at least one of N,N-dimethylformamide (DMF) or N,N-diethylformamide (DEF).

2.4.2. Carboxylic Acid

In the manufacturing method according to the present disclosure, by using a carboxylic acid as the solvent, an ion of the carboxylic acid functions as a monodentate ligand such that the number of multidentate ligands coordinated to the metal cluster can be restricted and the crystal structure of the MOF according to the present disclosure can be easily formed. The carboxylic acid used in the manufacturing method according to the present disclosure is not particularly limited as long as it can supply the ion of the carboxylic acid that functions as the monodentate ligand of the MOF according to the present disclosure. Examples of the carboxylic acid include a monovalent linear saturated aliphatic carboxylic acid having 1 to 3 carbon atoms. In particular, the carboxylic acid is not particularly limited and is preferably at least one selected from the group consisting of formic acid, acetic acid, and propanoic acid and more preferably at least one of formic acid or acetic acid.

2.5. Heating Step (S1)

The heating step (S1) is the step of heating the solution including the metal ion source, the organic molecule having a trimesic acid skeleton or the salt of an organic molecule having a trimesic acid skeleton, the organic molecule having an isophthalic acid skeleton or the salt, and the solvent.

The heating temperature in the heating step (S1) is not particularly limited as long as it is a temperature at which the MOF can be manufactured, and is preferably 100 to 150° C. In a case where the heating temperature is lower than 100° C., the reactivity is low, and the MOF is not likely to be manufactured. In a case where the heating temperature is higher than 150° C., the vapor pressure is high, and vapor leakage may occur. It is preferable that the heating time in the heating step (S1) is 6 hours or longer. In a case where the heating time is shorter than 6 hours, raw material may not react with each other completely.

Synthesis of Metal-Organic Framework (MOF)

Using the following reagents, metal-organic frameworks (MOF) according to Examples 1 to 12 and Comparative Examples 1 to 12 were synthesized.

Reagent

Zirconium oxychloride octahydrate ($ZrOCl_2 \cdot 8H_2O$; manufactured by Sigma-Aldrich Corporation)

Zirconium chloride ($ZrCl_4$, manufactured by Sigma-Aldrich Corporation)

Trimesic acid ($H_3BTC$, manufactured by Sigma-Aldrich Corporation)

Isophthalic acid (m-$H_2BDC$, manufactured by Tokyo Chemical Industry Co., Ltd.)

5-hydroxyisophthalic acid (5-OH-m-$H_2BDC$, manufactured by Tokyo Chemical Industry Co., Ltd.)

5-nitroisophthalic acid (5-$NO_2$-m-$H_2BDC$, manufactured by Tokyo Chemical Industry Co., Ltd.)

5-tert-butylisophthalic acid (5-tert-Bu-m-$H_2BDC$, manufactured by Tokyo Chemical Industry Co., Ltd.)

5-methylisophthalic acid (5-$CH_3$-m-$H_2BDC$, manufactured by Tokyo Chemical Industry Co., Ltd.)

4,6-dimethylisophthalic acid (4,6-$(CH_3)_2$-m-$H_2BDC$, manufactured by Tokyo Chemical Industry Co., Ltd.)

4-bromoisophthalic acid (4-Br-m-$H_2BDC$, manufactured by Tokyo Chemical Industry Co., Ltd.)

Terephthalic acid (p-$H_2BDC$, manufactured by Tokyo Chemical Industry Co., Ltd.)

Sodium 5-sulfoisophthalate (5-$SO_3$Na-m-$H_2BDC$, manufactured by Tokyo Chemical Industry Co., Ltd.)

Acetic acid (manufactured by Wako Pure Chemical Industries Ltd.)

Formic acid (manufactured by Wako Pure Chemical Industries Ltd.)

N,N-dimethylformamide (DMF, manufactured by Wako Pure Chemical Industries Ltd.)

N,N-diethylformamide (DEF, manufactured by Tokyo Chemical Industry Co., Ltd.)

EXAMPLE 1

(1) 387 mg (120 mmol) of zirconium oxychloride octahydrate ($ZrOCl_2 \cdot 8H_2O$), 76 mg (36 mmol) of trimesic acid ($H_3BTC$), 7 mg (4 mmol) of isophthalic acid (m-$H_2BDC$), 20 mL of acetic acid, and 20 mL of N,N-dimethylformamide (DMF) were added to a 100 ml PTFE container (HUT-100, manufactured by SAN-AI Kagaku Co., Ltd.).

(2) The PTFE container was put into a pressure-resistant stainless steel external cylinder (HUS-100, manufactured by SAN-AI Kagaku Co., Ltd.) and was heated at 130° C. for 48 hours.

Figure 8:
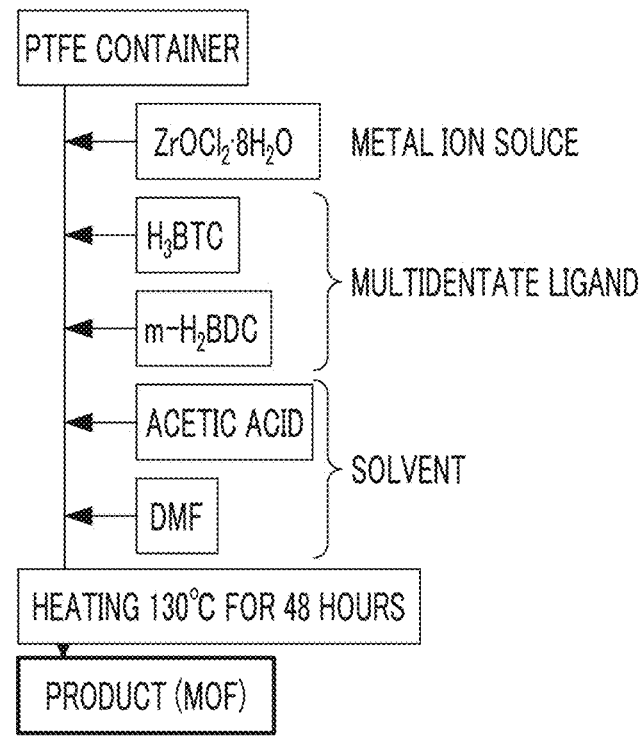
FIG. 8 is a flowchart showing a method of manufacturing an MOF according to Example 1.

(3) The product was filtered, was washed with 10 mL of DMF three times, was washed with 10 mL of acetone (manufactured by Wako Pure Chemical Industries Ltd.) three times, and was heated and dried at 60° C. overnight while reducing the pressure to be $10^{-1}$ Pa or lower. As a result, 280 mg of the product (MOF according to Example 1) was obtained. FIG. 8 shows a flowchart of the manufacturing method according to Example 1.

EXAMPLE 2

(1) An MOF according to Example 2 was obtained using the same method as in Example 1, except that the amount of trimesic acid ($H_3BTC$) was changed to 67 mg (32 mmol) and the amount of isophthalic acid (m-$H_2BDC$) was changed to 13 mg (8 mmol).

EXAMPLE 3

(1) An MOF according to Example 3 was obtained using the same method as in Example 1, except that the amount of trimesic acid ($H_3BTC$) was changed to 59 mg (28 mmol) and the amount of isophthalic acid (m-$H_2BDC$) was changed to 20 mg (12 mmol).

EXAMPLE 4

(1) An MOF according to Example 4 was obtained using the same method as in Example 1, except that 7 mg (4 mmol) of 5-hydroxyisophthalic acid (5-OH-m-$H_2BDC$) was used instead of 7 mg (4 mmol) of isophthalic acid (m-$H_2BDC$).

EXAMPLE 5

(1) An MOF according to Example 5 was obtained using the same method as in Example 1, except that 8 mg (4 mmol) of 5-nitroisophthalic acid (5-$NO_2$-m-$H_2BDC$) was used instead of 7 mg (4 mmol) of isophthalic acid (m-$H_2BDC$).

EXAMPLE 6

(1) An MOF according to Example 6 was obtained using the same method as in Example 1, except that 9 mg (4 mmol) of 5-tert-butylisophthalic acid (5-tert-Bu-m-$H_2BDC$) was used instead of 7 mg (4 mmol) of isophthalic acid (m-$H_2BDC$).

EXAMPLE 7

(1) An MOF according to Example 7 was obtained using the same method as in Example 1, except that 7 mg (4 mmol) of 5-methylisophthalic acid (5-$CH_3$-m-$H_2BDC$) was used instead of 7 mg (4 mmol) of isophthalic acid (m-$H_2BDC$).

EXAMPLE 8

(1) An MOF according to Example 8 was obtained using the same method as in Example 1, except that 8 mg (4 mmol) of 4,6-dimethylisophthalic acid (4,6-$(CH_3)_2$-m-$H_2BDC$) was used instead of 7 mg (4 mmol) of isophthalic acid (m-$H_2BDC$).

EXAMPLE 9

(1) An MOF according to Example 9 was obtained using the same method as in Example 1, except that 10 mg (4 mmol) of 4-bromoisophthalic acid (4-Br-m-$H_2$BDC) was used instead of 7 mg (4 mmol) of isophthalic acid (m-$H_2$BDC).

EXAMPLE 10

(1) An MOF according to Example 10 was obtained using the same method as in Example 3, except that 280 mg (120 mmol) of zirconium chloride ($ZrCl_4$) was used instead of 387 mg (120 mmol) of zirconium oxychloride octahydrate ($ZrOCl_2 \cdot 8H_2O$).

EXAMPLE 11

(1) An MOF according to Example 11 was obtained using the same method as in Example 3, except that 20 mL of formic acid was used instead of 20 mL of acetic acid.

EXAMPLE 12

(1) An MOF according to Example 12 was obtained using the same method as in Example 3, except that 20 mL of N,N-diethylformamide (DEF) was used instead of 20 mL of N,N-dimethylformamide (DMF).

COMPARATIVE EXAMPLE 1

(1) An MOF according to Comparative Example 1 was obtained using the same method as in Example 1, except that the amount of trimesic acid ($H_3$BTC) was changed to 84 mg (40 mmol) and the amount of isophthalic acid (m-$H_2$BDC) was changed to 0 mg (0 mmol).

COMPARATIVE EXAMPLE 2

(1) An MOF according to Comparative Example 2 was obtained using the same method as in Example 1, except that the amount of trimesic acid ($H_3$BTC) was changed to 50 mg (24 mmol) and the amount of isophthalic acid (m-$H_2$BDC) was changed to 27 mg (16 mmol).

COMPARATIVE EXAMPLE 3

(1) An MOF according to Comparative Example 3 was obtained using the same method as in Example 1, except that the amount of trimesic acid ($H_3$BTC) was changed to 42 mg (20 mmol) and the amount of isophthalic acid (m-$H_2$BDC) was changed to 33 mg (20 mmol).

COMPARATIVE EXAMPLE 4

(1) An MOF according to Comparative Example 4 was obtained using the same method as in Example 1, except that 11 mg (4 mmol) of sodium 5-sulfoisophthalate (5-$SO_3$Na-m-$H_2$BDC) was used instead of 7 mg (4 mmol) of isophthalic acid (m-$H_2$BDC).

COMPARATIVE EXAMPLE 5

(1) An MOF according to Comparative Example 5 was obtained using the same method as in Comparative Example 4, except that the amount of trimesic acid ($H_3$BTC) was changed to 67 mg (32 mmol) and the amount of sodium 5-sulfoisophthalate (5-$SO_3$Na-m-$H_2$BDC) was changed to 21 mg (8 mmol).

COMPARATIVE EXAMPLE 6

(1) An MOF according to Comparative Example 6 was obtained using the same method as in Comparative Example 4, except that the amount of trimesic acid ($H_3$BTC) was changed to 59 mg (28 mmol) and the amount of sodium 5-sulfoisophthalate (5-$SO_3$Na-m-$H_2$BDC) was changed to 32 mg (12 mmol).

COMPARATIVE EXAMPLE 7

(1) An MOF according to Comparative Example 7 was obtained using the same method as in Example 1, except that 7 mg (4 mmol) of terephthalic acid (p-$H_2$BDC) was used instead of 7 mg (4 mmol) of isophthalic acid (m-$H_2$BDC).

COMPARATIVE EXAMPLE 8

(1) An MOF according to Comparative Example 8 was obtained using the same method as in Comparative Example 7, except that the amount of trimesic acid ($H_3$BTC) was changed to 67 mg (32 mmol) and the amount of terephthalic acid (p-$H_2$BDC) was changed to 13 mg (8 mmol).

COMPARATIVE EXAMPLE 9

(1) An MOF according to Comparative Example 9 was obtained using the same method as in Comparative Example 7, except that the amount of trimesic acid ($H_3$BTC) was changed to 59 mg (28 mmol) and the amount of terephthalic acid (p-$H_2$BDC) was changed to 20 mg (12 mmol).

COMPARATIVE EXAMPLE 10

(1) An MOF according to Comparative Example 10 was obtained using the same method as in Comparative Example 1, except that 280 mg (120 mmol) of zirconium chloride ($ZrCl_4$) was used instead of 387 mg (120 mmol) of zirconium oxychloride octahydrate ($ZrOCl_2 \cdot 8H_2O$).

COMPARATIVE EXAMPLE 11

(1) An MOF according to Comparative Example 11 was obtained using the same method as in Comparative Example 1, except that 20 mL of formic acid was used instead of 20 mL of acetic acid.

COMPARATIVE EXAMPLE 12

(1) An MOF according to Comparative Example 12 was obtained using the same method as in Comparative Example 1, except that 20 mL of N,N-diethylformamide (DEF) was used instead of 20 mL of N,N-dimethylformamide (DMF).

Measurement Items (1) X-ray Diffraction Measurement (Verification of Crystal Structure)

Regarding each of the MOFs according to Examples 1 to 12 and Comparative Examples 1 to 12, X-ray diffraction measurement was performed. A measuring device and measurement conditions are as follows.

Measuring device: RINTRAPID II (manufactured by Rigaku Corporation)

Measurement conditions: voltage=50 V, current=100 mA, collimator diameter φ=0.3, sample angle ω=15°

Figure 9:
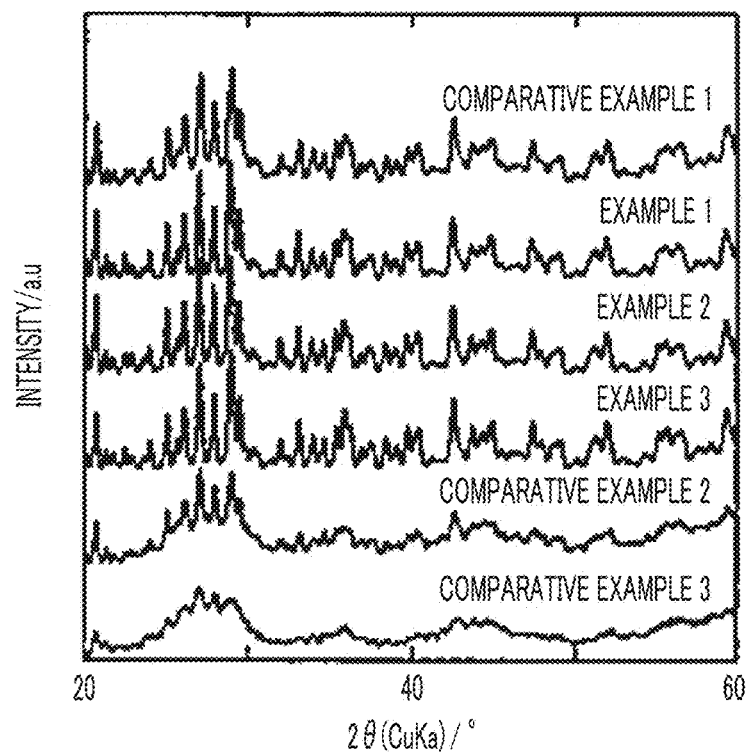
FIG. 9 is a graph showing X-ray diffractions of MOFs according to Examples 1 to 3 and Comparative Examples 1 to 3.
Figure 10:
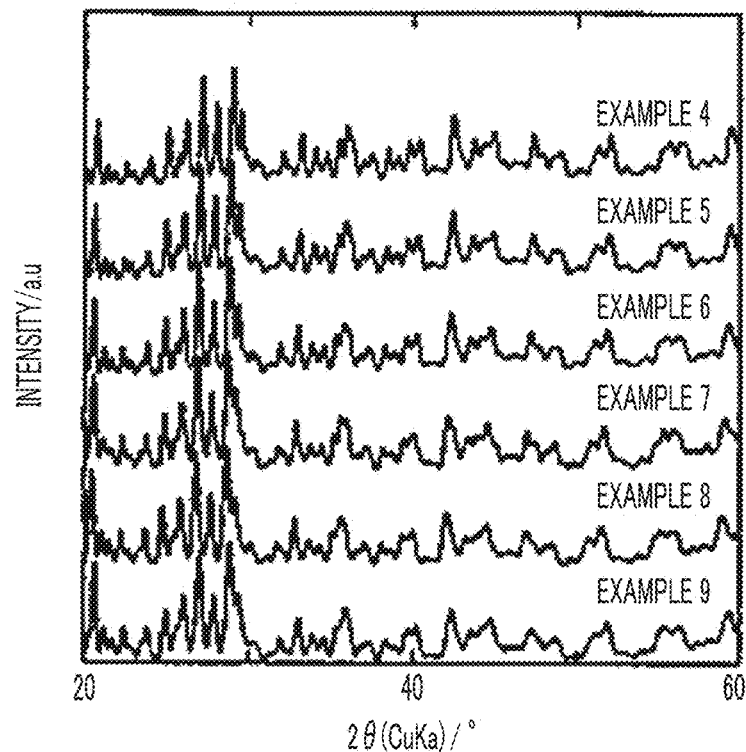
FIG. 10 is a graph showing X-ray diffractions of MOFs according to Examples 4 to 9.
Figure 11:
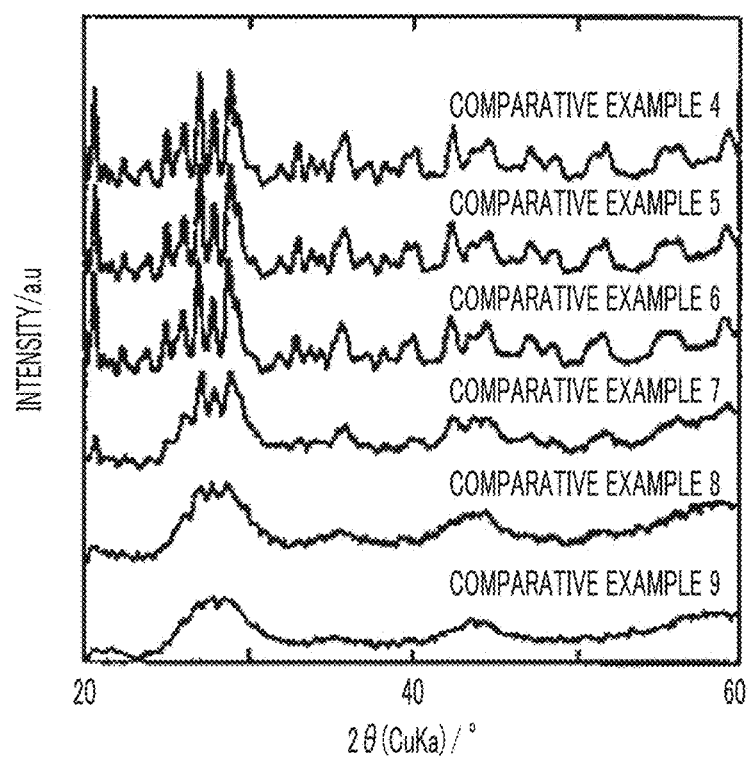
FIG. 11 is a graph showing X-ray diffractions of MOFs according to Comparative Examples 4 to 9.
Figure 12:
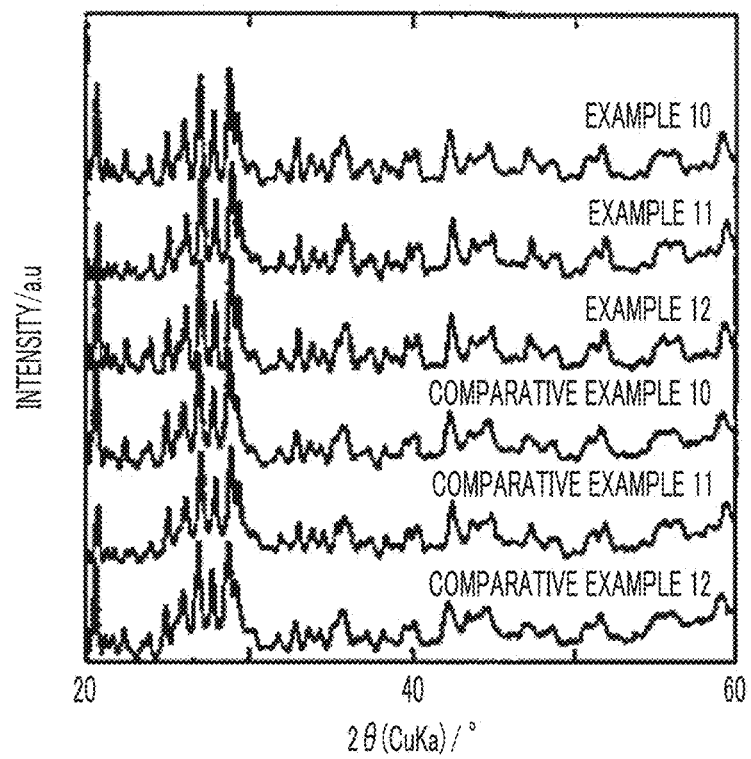
FIG. 12 is a graph showing X-ray diffractions of MOFs according to Examples 10 to 12 and Comparative Examples 10 to 12.

FIG. 9 shows the measurement results of Examples 1 to 3 and Comparative Examples 1 to 3, FIG. 10 shows the measurement results of Examples 4 to 9, FIG. 11 shows the measurement results of Comparative Examples 4 to 9, and FIG. 12 shows the measurement results of Examples 10 to 12 and Comparative Examples 10 to 12.

(2) Nitrogen Adsorption Amount Measurement (Verification of Pore Volume)

Regarding each of the MOFs according to Examples 1 to 12 and Comparative Examples 1 to 12, the nitrogen adsorption isotherm was measured after a pretreatment, and the nitrogen adsorption amount at a relative pressure of 0 to 0.5 was obtained. A pretreatment device, pretreatment conditions, a measuring device, and measurement conditions are as follows.

Pretreatment device: BELPREP-vac II (manufactured by MicrotracBEL Corporation)

Pretreatment conditions: vacuum degree<$10^{-2}$ kPa, heated at 130° C. for 6 hours Measuring device: BELSORP-max (manufactured by MicrotracBEL Corporation)

Measurement conditions: temperature: 77 K, nitrogen adsorption was measured at a relative pressure of 0 to 0.99

Figure 13:
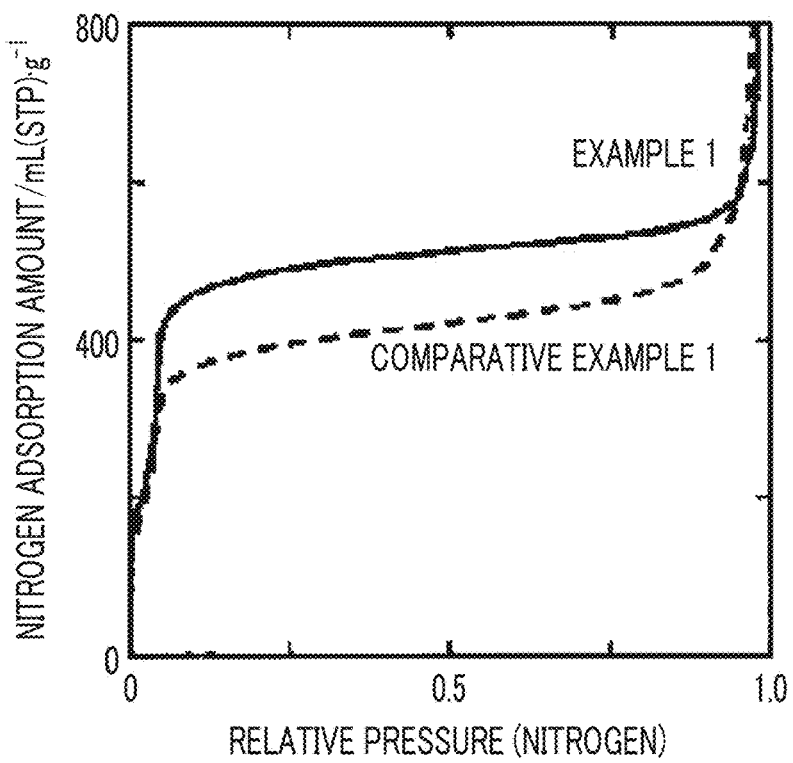
FIG. 13 is a graph showing nitrogen adsorption isotherms of the MOFs according to Example 1 and Comparative Example 1.
Figure 14:
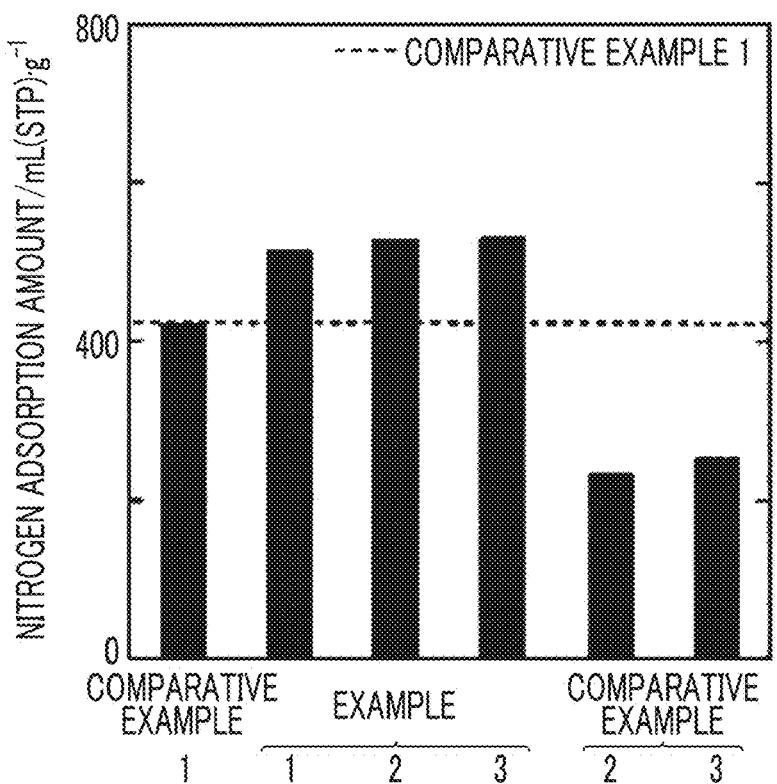
FIG. 14 is a graph showing the nitrogen adsorption amounts of the MOFs according to Examples 1 to 3 and Comparative Examples 1 to 3.
Figure 15:
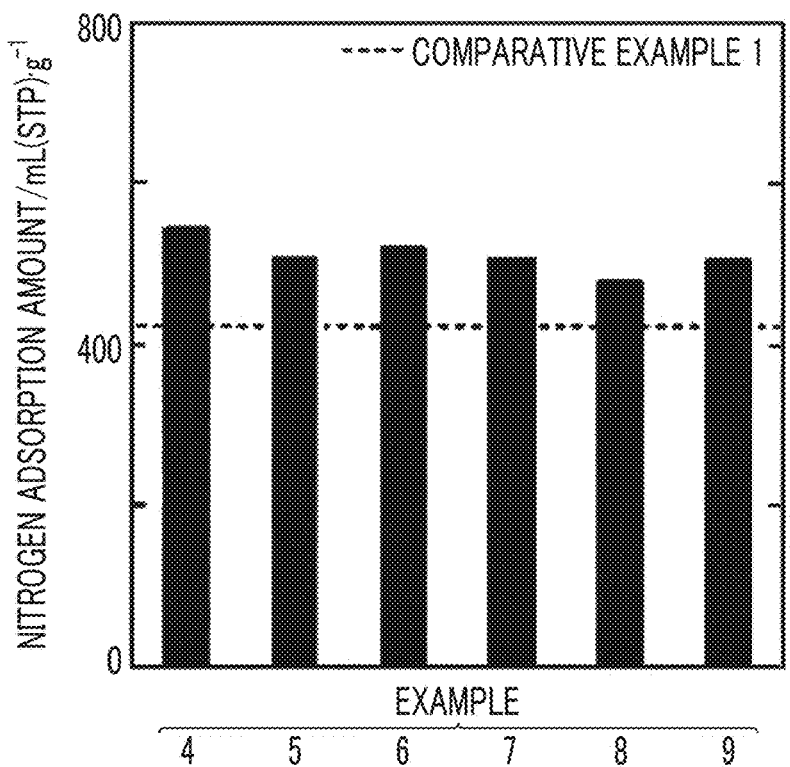
FIG. 15 is a graph showing the nitrogen adsorption amounts of the MOFs according to Examples 4 to 9.
Figure 16:
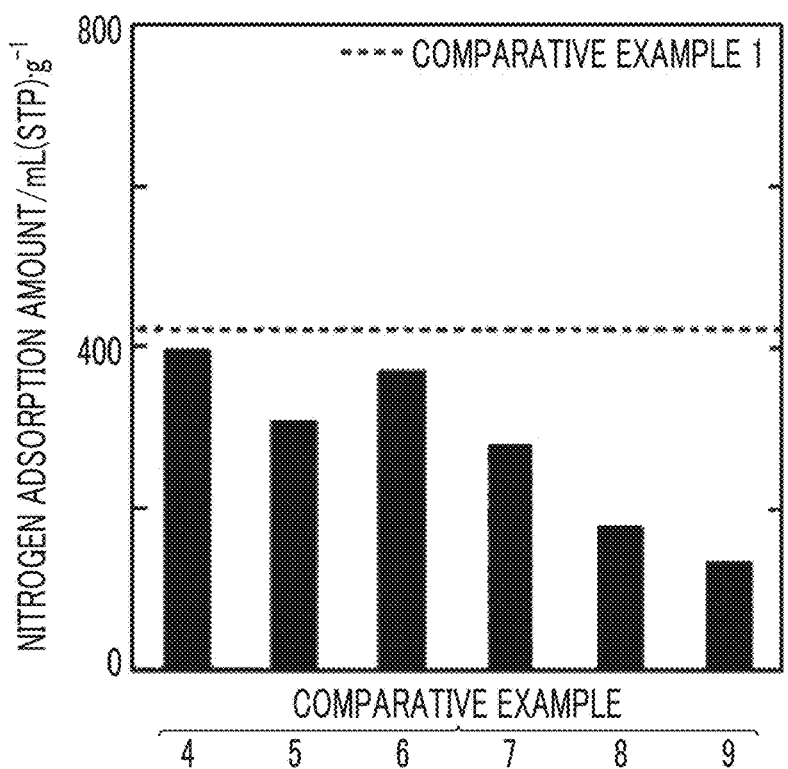
FIG. 16 is a graph showing the nitrogen adsorption amounts of the MOFs according to Comparative Examples 4 to 9.
Figure 17:
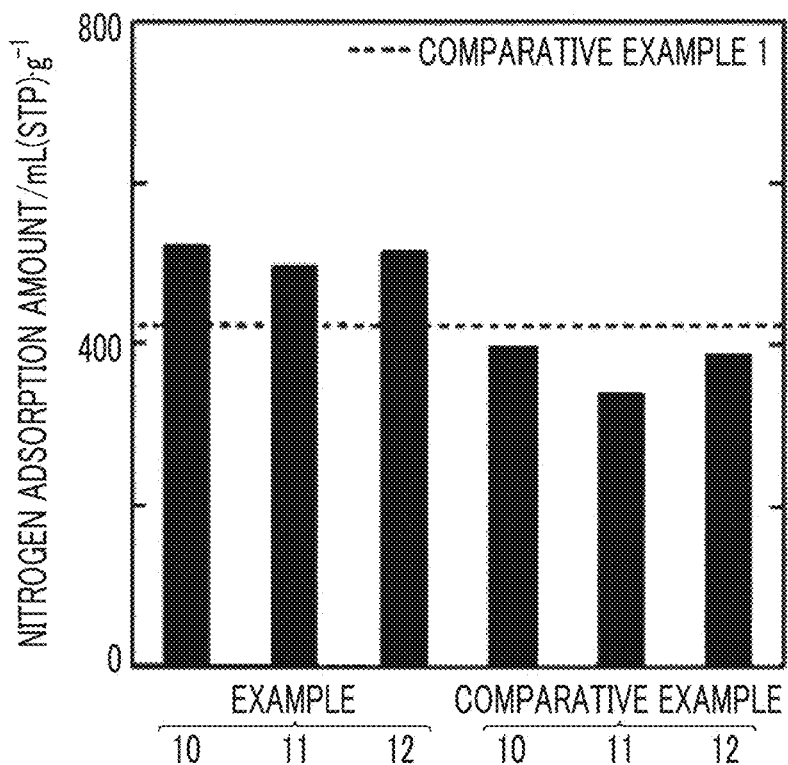
FIG. 17 is a graph showing the nitrogen adsorption amounts of the MOFs according to Examples 10 to 12 and Comparative Examples 10 to 12.

FIG. 13 shows nitrogen adsorption isotherms of the MOFs according to Example 1 and Comparative Example 1. FIG. 14 shows the nitrogen adsorption amounts of the MOFs according to Examples 1 to 3 and Comparative Examples 1 to 3, FIG. 15 shows the nitrogen adsorption amounts of the MOFs according to Examples 4 to 9, FIG. 16 shows the nitrogen adsorption amounts of the MOFs according to Comparative Examples 4 to 9, and FIG. 17 shows the nitrogen adsorption amounts of the MOFs according to Examples 10 to 12 and Comparative Examples 10 to 12.

(3) $^1$H-NMR Measurement (Composition Analysis of MOF)

Regarding each of the products (the MOFs according to Examples 1 to 12 and Comparative Examples 1 to 3), a $^1$H-NMR spectrum of the solution after decomposition was measured, and the proportion of the ligands in the MOF was obtained based on an integral ratio. Decomposition conditions, a measuring device, and measurement conditions are as follows.

Decomposition conditions: about 10 mg of the product (MOF) was decomposed using 1 mL of deutero sulfuric acid ($D_2SO_4$)

Measuring device: JNM-AL400 (manufactured by JEOL Ltd.)

Measurement conditions: the $^1$H-NMR spectrum of the solution was measured by using tetramethylsilane (TMS) as an internal standard Table 1 shows the kinds and proportions of the ligands in the MOFs according to Examples 1 to 12 and Comparative Examples 1 to 3.

(4) Water Vapor Adsorption and Desorption Measurement (Evaluation of Water Vapor Adsorption and Desorption Characteristics)

Regarding each of the products (the MOFs according to Examples 1 to 12 and Comparative Examples 1), water vapor adsorption and desorption isotherms were measured after a pretreatment, and the water vapor adsorption amount at a relative pressure of 0.2 to 0.4 and the water vapor desorption amount at a relative pressure of 0.4 to 0.2 were obtained. A pretreatment device, pretreatment conditions, a measuring device, and measurement conditions are as follows.

Pretreatment device: BELPREP-vac II (manufactured by MicrotracBEL Corporation)

Pretreatment conditions: vacuum degree<$10^{-2}$ Pa, heated at 130° C. for 6 hours Measuring device: BELSORP-max (manufactured by MicrotracBEL Corporation)

Measurement conditions: the water vapor adsorption amount at a relative pressure of 0 to 0.85 and the water vapor desorption amount at a relative pressure of 0.85 to 0.05 were measured at a temperature of 20° C.

Figure 18:
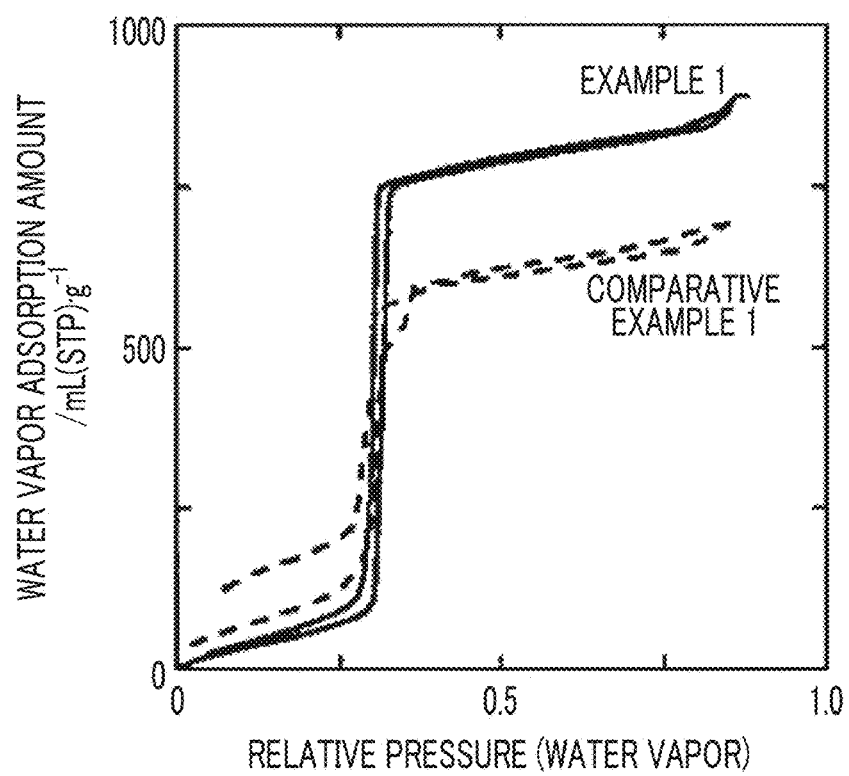
FIG. 18 is a graph showing water vapor adsorption and desorption isotherms of the MOFs according to Example 1 and Comparative Example 1.
Figure 19:
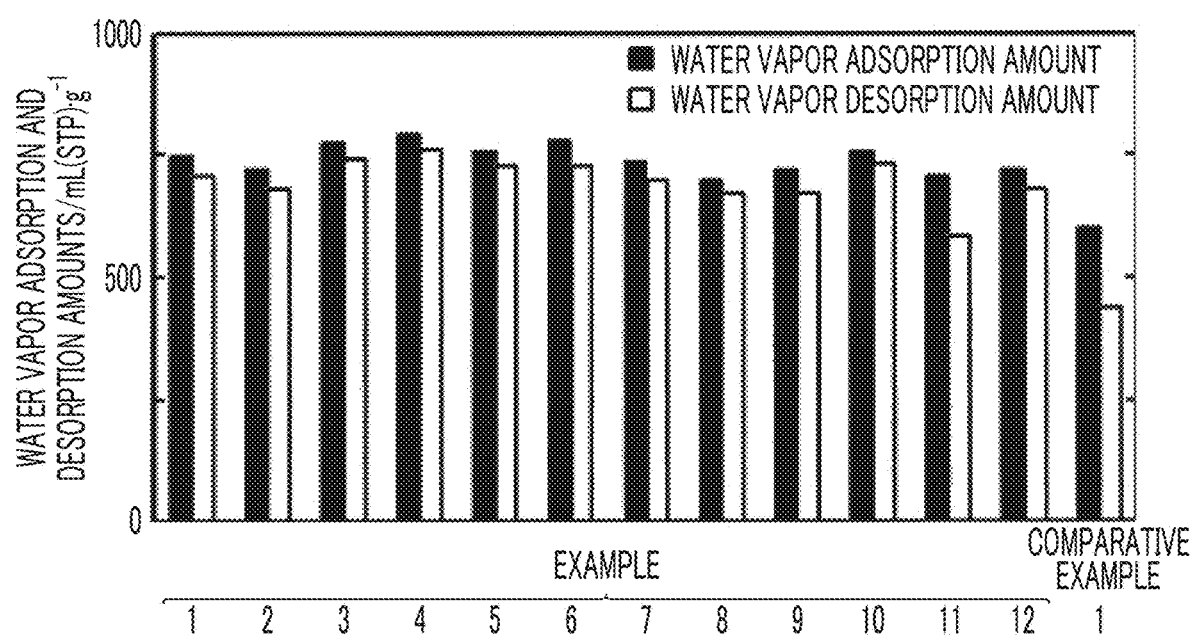
FIG. 19 is a graph showing the water vapor adsorption and desorption amounts of the MOFs according to Examples 1 to 12 and Comparative Example 1.

FIG. 18 shows water vapor adsorption and desorption curves of Example 1 and Comparative Example 1 at 20° C. FIG. 19 shows the measurement results of the adsorption amounts and the desorption amounts of water vapor of Examples 1 to 12 and Comparative Example 1.

TABLE 1

Kind, Addition Amount, and Exchange Amount of Ligand Added

| | Ligand Added | Addition Amount/mol % | Exchange Amount/mol % |
|---|---|---|---|
| Comparative Example 1 | — | — | — |
| Example 1 | m-$H_2$BDC | 10 | 3.0 |
| Example 2 | m-$H_2$BDC | 20 | 4.9 |
| Example 3 | m-$H_2$BDC | 30 | 5.3 |
| Comparative Example 2 | m-$H_2$BDC | 40 | 8.4 |
| Comparative Example 3 | m-$H_2$BDC | 50 | 9.3 |
| Example 4 | 5-OH-m-$H_2$BDC | 10 | 3.3 |
| Example 5 | 5-$NO_2$-m-$H_2$BDC | 10 | 1.8 |
| Example 6 | 5-tert-Bu-m-$H_2$BDC | 10 | 1.2 |
| Example 7 | 5-$CH_3$-m-$H_2$BDC | 10 | 3.0 |
| Example 8 | 4,6-$(CH_3)_2$-m-$H_2$BDC | 10 | 2.6 |
| Example 9 | 4-Br-m-$H_2$BDC | 10 | 3.2 |
| Example 10 | m-$H_2$BDC | 30 | 5.5 |
| Example 11 | m-$H_2$BDC | 30 | 5.8 |
| Example 12 | m-$H_2$BDC | 30 | 5.0 |

Results (1) X-Ray Diffraction Measurement

As shown in FIG. 9, in Examples 1 to 3, the same graph of X-ray diffraction as in Comparative Example 1 was obtained. On the other hand, in Comparative Examples 2 and 3, crystallinity clearly deteriorated compared to Comparative Example 1. The reason for this is presumed to be that, in a case where the addition amount of isophthalic acid (m-$H_2$BDC) is higher than 40 mol %, the amount of defects increases and it is difficult to maintain the crystal structure. As shown in FIG. 10, in Examples 4 to 9, the same graph of X-ray diffraction as in Comparative Example 1 was obtained. It was found from the result that any organic molecule having an isophthalic acid skeleton exhibits the same effect as that of isophthalic acid (m-$H_2$BDC) irrespective of the kind, position, and number of functional groups. As shown in FIG. 11, in Comparative Examples 4 to 6, the same graph of X-ray diffraction as in Comparative Example 1 was obtained. The reason for this is presumed to be that, since sodium 5-sulfoisophthalate (5-SO$_3$Na-m-H$_2$BDC) as a sodium salt of the organic molecule having an isophthalic acid skeleton was added, the same effect as that of isophthalic acid (m-H$_2$BDC) was exhibited. On the other hand, in Comparative Examples 7 to 9, as the addition amount of terephthalic acid (p-H$_2$BDC) increased, the crystallinity deteriorated. The reason for this is presumed to be as follows. Terephthalic acid (p-H$_2$BDC) is also a bidentate ligand in which two carboxyl groups are bonded to a benzene ring as in the case of isophthalic acid (m-H$_2$BDC). However, terephthalic acid (p-H$_2$BDC) in which an angle between two carboxyl groups was 180° was not able to be exchanged with trimesic acid (H$_3$BTC) in which an angle between three carboxyl groups was 120° as it is, and thus the crystal structure collapsed. As shown in FIG. 12, in Examples 10 to 12 and Comparative Examples 10 to 12, the same graph of X-ray diffraction as in Comparative Example 1 was obtained. As a result, it was found that the same crystal structure was manufactured irrespective of the kind of the metal ion source or the solvent.

(2) Nitrogen Adsorption Amount Measurement

As shown in FIG. 13, in Example 1, the nitrogen adsorption amount increased compared to that of Comparative Example 1. The reason for this is presumed to be as follows. By exchanging the trimesate ion (BTC$^{3-}$, tridentate ligand) with the isophthalate ion (m-BDC$^{2-}$, bidentate ligand), functional groups coordinated to the metal ions and negative electric charges were insufficient, and defects were introduced into the structure for charge compensation. As a result, the weight decreased due to a decrease in skeleton density, and a new space capable of adsorption increased.

As shown in FIG. 14, in Examples 1 to 3, the nitrogen adsorption amount increased compared to that of Comparative Example 1. On the other hand, in Comparative Examples 2 and 3, the nitrogen adsorption amount was less than that of Comparative Example 1. The reason for this is presumed to be that, in a case where the addition amount of isophthalic acid (m-H$_2$BDC) is higher than 40 mol %, the amount of defects increases and it is difficult to maintain the crystal structure.

As shown in FIG. 15, in Examples 4 to 9, as in Examples 1 to 3, the nitrogen adsorption amount increased compared to that of Comparative Example 1. The reason for this is presumed to be that any organic molecule having an isophthalic acid skeleton exhibits the same effect as that of isophthalic acid (m-H$_2$BDC) irrespective of the kind, position, and number of functional groups.

As shown in FIG. 16, in Comparative Examples 4 to 6, the nitrogen adsorption amount did not increase compared to that of Comparative Example 1. The reason for this is presumed to be as follows. Due to a SO$_3^-$ group produced by electrolytic dissociation of Na$^+$ from a SO$_3$Na group in the fifth position of sodium 5-sulfoisophthalate (5-SO$_3$Na-m-H$_2$BDC), a 5-sulfoisophthalate ion (5-SO$_3$-m-BTC$^{3-}$) functioned as a negative trivalent ion, and the valence thereof was the same as that of trimesate ion (BTC$^{3-}$) to be exchanged. Therefore, charge compensation was not needed and the introduction of defects (defects of positively charged metal ions) did not occur. In Comparative Examples 7 to 9, the nitrogen adsorption amount decreased compared to that of Comparative Example 1, and as the addition amount of terephthalic acid (p-H$_2$BDC) increased, the nitrogen adsorption amount decreased. As described above with reference to FIG. 11, the reason for this is presumed to be that terephthalic acid (p-H$_2$BDC) was not able to be exchanged with trimesic acid (H$_3$BTC) as it is, and thus the crystal structure collapsed.

As shown in FIG. 17, in Examples 10 to 12, the nitrogen adsorption amount increased compared to that of Comparative Examples 10 to 12. As a result, it was found that the same crystal structure was manufactured irrespective of the kind of the metal ion source or the solvent.

(3) $^1$H-NMR Measurement

As shown in Table 1, it was found that, in Examples 1 to 12, the trimesate ion (tridentate ligand) was exchanged with the ion having an isophthalic acid skeleton (bidentate ligand). In Comparative Examples 2 and 3, it is presumed that the amount exchanged with isophthalate ion (m-BDC$^{2-}$) was large, and in a case where the amount is 8.4 mol % or higher, the crystal structure was not able to be maintained.

(4) Water Vapor Absorption and Desorption Measurement

As shown in FIG. 18, in Example 1, the water vapor adsorption amount increased compared to that of Comparative Example 1. As described above with reference to FIG. 16, the reason for this is presumed to be as follows. By exchanging the trimesate ion (BTC$^{3-}$, tridentate ligand) with the isophthalate ion (m-BDC$^{2-}$, bidentate ligand), functional groups coordinated to the metal ions and negative electric charges were insufficient, and defects were introduced into the structure for charge compensation. As a result, the weight decreased due to a decrease in skeleton density, and a new space capable of adsorption increased. In Example 1, the water vapor desorption amount increased compared to that of Comparative Example 1. The reason for this is presumed to be as follows. Due to the introduction of defects, entrances of small pores increased, and an ink bottle structure was deformed. As a result, water vapor adsorbed in the small pores was easily desorbed. As shown in FIG. 19, in Examples 1 to 12, the water vapor adsorption amount and the water vapor desorption amount were improved compared to those of Comparative Example 1.

What is claimed is:

1. A metal-organic framework comprising:
   a Zr$^{4+}$ metal ion; and
   an ion of a first organic molecule having a trimesic acid skeleton and an ion of a second organic molecule having an isophthalic acid skeleton as multidentate ligands,
   wherein a proportion of the ion of the second organic molecule having the isophthalic acid skeleton is greater than or equal to 1.2 mol% and lower than 8.4 mol% with respect to all of the multidentate ligands.

2. The metal-organic framework according to claim 1, wherein the ion of the first organic molecule having the trimesic acid skeleton is a trimesate ion.

3. The metal-organic framework according to claim 1, wherein an overall electric charge of the ion of the second organic molecule having the isophthalic acid skeleton is −2 or more.

4. The metal-organic framework according to claim 1, wherein the ion of the second organic molecule having the isophthalic acid skeleton is at least one selected from the group consisting of an isophthalate ion, a 5-hydroxyisophthalate ion, a 5-nitroisophthalate ion, a 5-tert-butylisophthalate ion, a 5-chloroisophthalate ion, a 4-bromoisophthalate ion, and a 4,6-dimethylisophthalate ion.

5. The metal-organic framework according to claim 1, wherein the ion of the second organic molecule having the isophthalic acid skeleton is an isophthalate ion.

6. The metal-organic framework according to claim 1, further comprising a monovalent linear saturated aliphatic carboxylate ion having 1 to 3 carbon atoms as a monodentate ligand.

7. The metal-organic framework according to claim 6, wherein the monodentate ligand is at least either a formate ion or an acetate ion.

8. A method of manufacturing a metal-organic framework, the method comprising:
heating a solution including a zirconium compound which is a $Zr^{4+}$ metal ion source, a first organic molecule having a trimesic acid skeleton or a salt of the first organic molecule having the trimesic acid skeleton, a second organic molecule having an isophthalic acid skeleton or a salt of the second organic molecule having the isophthalic acid skeleton, and a solvent to obtain the metal organic framework,
wherein the metal-organic framework comprises:
a $Zr^{4+}$ metal ion; and
an ion of the first organic molecule having the trimesic acid skeleton and an ion of the second organic molecule having the isophthalic acid skeleton as multidentate ligands, and
wherein a proportion of the ion of the second organic molecule having the isophthalic acid skeleton is greater than or equal to 1.2 mol% and lower than 8.4 mol% with respect to all of the multidentate ligands.

9. The method according to claim 8, wherein the zirconium compound is at least either zirconium oxychloride octahydrate or zirconium chloride.

10. The method according to claim 8, wherein the first organic molecule having the trimesic acid skeleton is trimesic acid.

11. The method according to claim 8, wherein the second organic molecule having the isophthalic acid skeleton does not have a functional group having a lower pKa than a carboxyl group of isophthalic acid.

12. The method according to claim 8, wherein the second organic molecule having the isophthalic acid skeleton is at least one selected from the group consisting of isophthalic acid, 5-hydroxyisophthalic acid, 5-nitroisophthalic acid, 5-tert-butylisophthalic acid, 5-chloroisophthalic acid, 4-bromoisophthalic acid, and 4,6-dimethylisophthalic acid.

13. The method according to claim 8, wherein the second organic molecule having the isophthalic acid skeleton is isophthalic acid.

14. The method according to claim 8, wherein, in the solution, a proportion of the second organic molecule having the isophthalic acid skeleton is lower than 40 mol% with respect to a total amount of the first organic molecule having the trimesic acid skeleton and the second organic molecule having the isophthalic acid skeleton.

15. The method according to claim 8, wherein an amide and a carboxylic acid are used as the solvent.

16. The method according to claim 15, wherein the amide is at least either N,N-dimethylformamide or N,N-diethylformamide.

17. The method according to claim 15, wherein the carboxylic acid is a monovalent linear saturated aliphatic carboxylic acid having 1 to 3 carbon atoms.

18. The method according to claim 15, wherein the carboxylic acid is at least either formic acid or acetic acid.

* * * * *